(12) United States Patent
Morris et al.

(10) Patent No.: US 6,299,998 B1
(45) Date of Patent: Oct. 9, 2001

(54) MOVABLE ANODE FUEL CELL BATTERY

(75) Inventors: William F. Morris, Harrison; Tsepin Tsai, Peekskill, both of NY (US)

(73) Assignee: Reveo, Inc., Elmsford, NY (US)

( * ) Notice: Subject to any disclaimer, the term of this patent is extended or adjusted under 35 U.S.C. 154(b) by 0 days.

(21) Appl. No.: 09/268,150

(22) Filed: Mar. 15, 1999

(51) Int. Cl.$^7$ .............................. H01M 4/00; H01M 8/04; H01M 8/12; H01M 2/38

(52) U.S. Cl. ................................ 429/27; 429/22; 429/26; 429/68; 429/69

(58) Field of Search ................................ 429/22, 26, 68, 429/69, 27

(56) References Cited

U.S. PATENT DOCUMENTS

| | | | |
|---|---|---|---|
| 3,252,838 | 5/1966 | Huber | 136/86 |
| 3,260,620 | 7/1966 | Gruber | 136/86 |

(List continued on next page.)

FOREIGN PATENT DOCUMENTS 1176488   1/1970   (GB) ............................ H01M/29/02

OTHER PUBLICATIONS

Fabrication of Thin–Film LIMN204 Cathodes for Rechargeable Microbateries by F.K. Shokoohi, et al., Applied Physics Letters, 1991, p. 1260–1262.
Battery Chargers by Mike Allen, Popular Mechanics, 1991, p. 30–31.
New Age EVs by Herb Schuldner, Popular Mechanics, 1991, p. 27–29.
Marketing Study for AER Energy Resources, Inc. by Authors not indicated, AER Energy Resources, Inc., 1991, p. 6–28.
Electric Car Showdown in Phoenix by Rick Cook, Popular Science, 1991, p. 64–65,82.
Batteries for Cordless Appliances by Ralph J. Brodd, Ch. 3 of Batteries for Cordless Appliances, 1987, p. 49–59.
105–044 PCT000 Search Report, 1998.
105–040PCT000 Search Report, 1998.
105–041PCT000 International Search Report, 1997.
Convert 3V to 5V Without Inductors by, Maxim Integrated Products; http://www.maxim–ic.com, vol. 92, 2000, p. 1–3.

(List continued on next page.)

*Primary Examiner*—Nam Nguyen
*Assistant Examiner*—Steven H. Ver Steeg
(74) *Attorney, Agent, or Firm*—Thomas J. Perkowski, Esq.; Ralph J. Crispino, Esq.

(57) ABSTRACT

A fuel cell battery having an electrolyte, and a moving anode having anode material deposited on two sides of an electrically conductive substrate, which can be either a rotating anode disk, or a linearly moving anode, sandwiched between two air electrodes wherein the air electrodes each have at least one recharging portion and at least one discharging portion. The recharging portion of the air electrode is designed for optimum recharging and the discharging portion of the air electrode is designed for optimum discharging such that the fuel cell battery performs to its maximum ability. The recharging air electrode area can be larger than the discharging air electrode area for faster recharge times. The recharging air electrode can be operated at lower current densities to prevent anode densification, anode shape change and dendrite growth. Discharging the anode material on both sides of the anode increases the depth of the discharge and increases the battery's capacity. The anode movement assures the anode is intermittently discharged to reduce passivation and further increase the depth of discharge. The motion of the anode helps to insure uniform replating during recharging. Further, the movement of the anode stirs the electrolyte assuring a uniform distribution of metal ions. As a result, the invention provides a metal/air Fuel Cell Battery with high energy density high power density and good rechargeability.

26 Claims, 3 Drawing Sheets

U.S. PATENT DOCUMENTS

| | | | |
|---|---|---|---|
| 3,357,864 | 12/1967 | Huber | 136/113 |
| 3,432,354 | 3/1969 | Jost | 136/86 |
| 3,436,270 | 4/1969 | Oswin | 136/86 |
| 3,454,429 | 7/1969 | Gruber | 136/86 |
| 3,532,548 | 10/1970 | Stachurski | 136/86 |
| 3,536,535 | 10/1970 | Lippincott | 136/86 |
| 3,577,281 | 5/1971 | Pountney | 136/6 |
| 3,663,298 | 5/1972 | McCoy et al. | 136/31 |
| 3,717,505 | 2/1973 | Unkle, Jr. et al. | 136/86 A |
| 3,822,149 | 7/1974 | Hale | 136/86 A |
| 3,845,835 | 11/1974 | Petit | 180/65 R |
| 3,909,685 | 9/1975 | Baker et al. | 318/139 |
| 3,928,072 | 12/1975 | Gerbler | 136/86 A |
| 3,963,519 | 6/1976 | Louie | 136/86 A |
| 3,977,901 | 8/1976 | Buzzelli | 136/86 A |
| 4,052,541 | 10/1977 | Krusenstierna | 429/233 |
| 4,152,489 | 5/1979 | Chottiner | 429/27 |
| 4,172,924 | 10/1979 | Warszawski | 429/15 |
| 4,246,324 | 1/1981 | de Nora et al. | 429/17 |
| 4,331,742 | 5/1982 | Lovelace | 429/33 |
| 4,341,847 | 7/1982 | Sammells | 429/27 |
| 4,551,399 | 11/1985 | Despic | 429/27 |
| 4,560,626 | 12/1985 | Joy | 429/27 |
| 4,626,482 | 12/1986 | Hamlen et al. | 429/27 |
| 4,689,531 | 8/1987 | Bacon | 318/139 |
| 4,693,946 | 9/1987 | Niksa et al. | 429/27 |
| 4,714,662 | 12/1987 | Bennett | 429/27 |
| 4,828,939 | 5/1989 | Turley et al. | 429/38 |
| 4,913,983 | 4/1990 | Cheiky | 429/13 |
| 4,916,036 | 4/1990 | Cheiky | 429/127 |
| 4,950,561 | 8/1990 | Niksa et al. | 429/27 |
| 4,957,826 | 9/1990 | Cheiky | 429/27 |
| 4,968,396 | 11/1990 | Harvey | 204/131 |
| 5,121,044 | 6/1992 | Goldman | 320/2 |
| 5,185,218 | 2/1993 | Brokman et al. | 429/27 |
| 5,190,833 | 3/1993 | Goldstein et al. | 429/27 |
| 5,196,275 | 3/1993 | Goldman et al. | 429/27 |
| 5,242,765 | 9/1993 | Naimer et al. | 429/42 |
| 5,250,370 | 10/1993 | Faris | 429/68 |
| 5,260,144 | 11/1993 | O'Callaghan | 429/14 |
| 5,306,579 | 4/1994 | Shepard, Jr. et al. | 429/40 |
| 5,312,701 | 5/1994 | Khasin et al. | 429/42 |
| 5,318,861 | 6/1994 | Harats et al. | 429/21 |
| 5,328,777 | 7/1994 | Bentz et al. | 429/27 |
| 5,328,778 | 7/1994 | Woodruff et al. | 429/27 |
| 5,354,625 | 10/1994 | Bentz et al. | 429/17 |
| 5,360,680 | 11/1994 | Goldman et al. | 428/27 |
| 5,362,577 | 11/1994 | Pedicini | 429/27 |
| 5,366,822 | 11/1994 | Korall et al. | 429/27 |
| 5,387,477 | 2/1995 | Cheiky | 429/26 |
| 5,389,456 | 2/1995 | Singh et al. | 429/27 |
| 5,405,713 | 4/1995 | Pecherer | 429/49 |
| 5,411,592 | 5/1995 | Ovshinsky et al. | 118/78 |
| 5,418,080 | 5/1995 | Korall et al. | 429/27 |
| 5,439,758 | 8/1995 | Stone et al. | 429/63 |
| 5,447,805 | 9/1995 | Harats et al. | 429/27 |
| 5,462,816 | 10/1995 | Okamura et al. | 429/18 |
| 5,486,429 | 1/1996 | Thibault | 429/27 |
| 5,512,384 | 4/1996 | Celeste et al. | 429/51 |
| 5,525,441 | 6/1996 | Reddy et al. | 429/127 |
| 5,536,592 | 7/1996 | Celeste et al. | 429/68 |
| 5,554,452 | 9/1996 | Delmolino et al. | 429/10 |
| 5,569,551 | 10/1996 | Pedicini et al. | 429/27 |
| 5,582,931 | 12/1996 | Kawahami | 429/127 |
| 5,599,637 | 2/1997 | Pecherer et al. | 429/27 |
| 5,691,074 | 11/1997 | Pedicini | 429/27 |
| 5,711,648 | 1/1998 | Hammerslag | 414/786 |
| 5,721,064 | 2/1998 | Pedicini et al. | 429/27 |
| 5,726,551 | 3/1998 | Miyazaki et al. | 320/6 |
| 5,756,228 | 5/1998 | Roseanou | 429/68 |
| 5,771,476 | 6/1998 | Mufford et al. | 701/22 |
| 5,904,999 | 5/1999 | Kimberg et al. | 428/27 |
| 5,978,283 | 11/1999 | Hsu et al. | 365/189.09 |
| 6,057,052 | 5/2000 | Shrim et al. | 429/27 |
| 6,127,061 | * 10/2000 | Shun et al. | 429/40 |

OTHER PUBLICATIONS

Derive 5V from Four AA Cells by, Maxim Integrated Products; http://www.maxim–ic.com, vol. 128, 2000, p. 1–2.

Boost/Linear Regulator Derives 5B from Four Cells by, Maxim Integrated Products, http://www.maxim–ic.com, 2000.

Fuel Cell Technology & Applications, http://www.metallicpower.com/rtfuel.htm by, Metallic Power, Inc., 1999.

Fuel Cells and Their Applications by Karl Kordesch and Gunter Simader, VCH Publishers, Inc., New York NY, Chapters 4.8.1–4.8.2, 1996, p. 158–162.

LBL Researchers work on new Generation of Batteries by Jeffery Kahn, www.lbl.gov/Science–Articles/Archive/battery–development–at–lbl.html, 1990, p. 1–6.

* cited by examiner

MOVABLE ANODE FUEL CELL BATTERY

BACKGROUND OF THE INVENTION

1. Field of the Invention

This invention relates to metal-air batteries and more particularly to a movable anode design for a metal-air fuel cell battery for improved charging and discharging of the anode.

2. Description of the Related Art

Some of the problems in the past with recharging metal air systems were due to shape change of the anode, densification of the anode and dendrite formation on the anode. These anode related problems limited the life of the rechargeable system. Solutions to these problems typically involved decreasing current density (for both discharging and recharging) and depth of discharge. Both of these side-effects severely cripple the metal-air system's chance of having good energy and power densities.

Metal-air batteries have been limited in the past because there has been a trade off between high energy/power densities and good charging characteristics.

Another limiting factor in the past has been finding a bifunctional air electrode which is efficient for both recharging and discharging.

Shape change is related to the lifetime of the system. When the shape changes during each recycling the capacity of the system decreases significantly and also will cause some shorting problems.

One attempt to solve the shape change problem used a reticulated sponge-like zinc anode which increased the surface area of the zinc (decreasing current density). The lowered current density decreased the energy density of the system. Further, the reticulated sponge-like zinc anode did not prevent dendrite growth.

Dendrites grow from the anode, reach through the separator, and touch the air electrode which shorts out the cell.

Attempts to limit dendrite growth on the reticulated zinc anode included using a chemically inert coating on the exterior of the anode. This reduced the dendrite growth but the loss of anode area lowered the capacity of the cell.

Anode shape change was combated using a pump to circulate the electrolyte. By continually stirring the electrolyte a more uniform distribution of zinc ions in solution will result. A uniform mixture of zinc ions in the electrolyte will greatly reduce shape change to the anode over repeated cycling.

Another attempt to limit shape change and dendrite growth was by L. R. McCoy and L. A. Heredy in 1972 (U.S. Pat. No. 3,663,298) whereby zinc pellets and electrolyte were used to fill about ⅔ of the volume of a circular rotating drum. One of the walls of this drum was the air electrode. The drum would rotate during discharging and recharging, and the zinc particle bed would continually mix within the cell. Because the particles could move freely, fresh zinc would continually and evenly be exposed to the air electrode. This provided a longer discharge life at higher current densities by providing even depositing of zinc during recharging.

The rotatable electrode had improved rechargeability characteristics. It was found possible to recharge and discharge the rotating electrode repeatedly at rates up to 100 $mA/cm^2$. Conventional zinc electrodes do not ordinarily withstand recharge rates in excess of 20 $mA/cm^2$ on repeated cycling without rapid failure by dendritic shorting. The high recharging rates were possible because the continual movement of the particle bed provided for a smooth, dendrite free, zinc coating on the pellets.

The rotatable electrode improved on conventional zinc/air technology, but required the use of an inefficient bifunctional air electrode.

Bifunctional air electrodes have very low cycle numbers because the electrode has to be used both for charging and discharging. It is very difficult to optimize such an electrode to function efficiently for both actions. In the past people have tried using many different catalysts and different electrode structures for bifunctional air electrodes, but the lives of the rechargeable zinc air systems are still severely limited.

Another attempt at solving the problems associated with recharging metal/air systems was in 1971 (see Fuel Cell and their Applications published in 1996, pg. 160). Sony corporation constructed a zinc/air cell containing a third electrode. The cell comprised a zinc anode sandwiched between one recharging air electrode and one discharging air electrode. The idea was to eliminate the need for a bifunctional air electrode. The zinc anode would be discharged from one side and recharged from the opposite side which optimized each electrode independently.

Sony's zinc/air cell was an improvement on the bifunctional air electrode. However, the zinc anode could only be discharged from one side, which cuts in half the power capabilities of the cell. Further, the zinc anode is charged from the side where it was discharged the least; which decreases the efficiency of the system.

Another problem with the Sony design is that the anode has to be a porous structure so that the electrolyte can flow from the discharge side to the recharge side to provide ions in solution from discharging in order to recharge again.

A patent to Faris U.S. Pat. No. 5,250,370 in FIGS. 8 and 9 shows a rotating anode with one air electrode on one side of the anode. This is another bifunctional air electrode and it only discharges and recharges on one side of the anode disk.

SUMMARY OF THE INVENTION

The invention uses a movable anode sandwiched between two stationary air electrodes. The air electrodes are divided into a recharge air electrode portion, to maximize recharging of the anode, and a discharge air electrode portion for maximizing the discharging of the anode. The anode is moved either rotationally or linearly with respect to the air electrodes; exposing portions of the anode alternately to the recharging and discharging portions of the air electrode. Electrolyte fills the space between the air electrodes and the movable anode.

Previous solutions to the metal/air rechargeability problem could only increase cycle life at the expense of decreasing energy and power densities. The Movable Anode Fuel Cell Battery increases cycle life and discharge performance simultaneously. Recyclability will be increased because:

1) The recharging electrode is meant solely for recharging. No bifunctional air electrodes are necessary. An air electrode meant solely for recharging will not limit the lifetime of the cell. The cycle life of the cell will be limited by the lifetime of the anode.

2) The electrolyte in each cell will be continually stirred during recharging. The stirring creates an even distribution of zinc ions in solution. This results in an even plating on the zinc anode, which greatly reduces the shape change of the anode.

3) The anode will be continually moving during recharging, which greatly reduces dendrite growth and shape change. These phenomena occur because of an uneven electric field distribution on the zinc surface. If one spot has a slightly higher electric field than another, this spot. will continually attract zinc ions. However, with the anode moving, the point of peak electric field will be changing positions and moving in and out of the recharging area; reducing the chances of localized buildup. If the movement alone does not stop dendrite growth, they can be removed mechanically by a stationary wiper attached to the air electrode holder. As the anode moves past this wiper, the dendrites will be smoothed out or scraped off.

4) The recharging air electrode of the cell can be several times larger than the discharging air electrode. This will allow for fast recharging while still using a low current density. With fixed anode systems the only way to decrease charging time is to increase charging current density. High charging current density significantly decreases cycle life and turnaround efficiency. Turnaround efficiency is a ratio of the power output of a cell and the power required to charge it. A decreased turnaround efficiency means less power is required to charge the cell.

High energy density is obtained because:

1) The design of the Movable Anode cell allows the cell's weight to be dominated by the metal anode. Consequently, the energy density of the cell has the ability to approach that of the metal anode.

2) The Movable Anode Fuel Cell Battery (FCB) has the ability to increase energy density by increasing the anode's depth of discharge (DOD). This means a greater percentage of the anode can be discharged. The Movable Anode FCB can increase DOD because it limits passivation. An anode will passivate if too much current is drawn from it in too short a time. Passivation can be substantially decreased if the anode is discharged intermittently (in other words, allowing the anode to rest between dischargings can eliminate passivation). The Movable Anode FCB will do exactly that. As each anode section moves away from the discharge electrodes, it has a rest period before it is discharged some more. In addition, because of the Movable Anode's unique recharging capabilities, the anode can afford to be discharged to a high DOD without sacrifice of cycle life whereas most recharging batteries must limit their DOD to ensure reasonable recycleability.

3) The discharging air electrode is meant solely for discharging. No bi-functional air electrodes are necessary. This means that the discharge electrode can be optimized exclusively for discharging. Bi-functional electrodes are inefficient for discharging because they must simultaneously be optimized for recharging. In addition, bi-functional electrodes are thick and heavy to slow down degradation processes. Their significant weight and size will reduce the energy density of the system.

4) The electrolyte in each cell will be continually stirred during discharging. By stirring the electrolyte it is possible to increase its capacity. This means less electrolyte is needed, which translates to a higher energy density.

OBJECTS OF THE INVENTION

It is an object of the invention to provide a rechargeable battery with high energy density, high power density, and good rechargeability.

It is an object of the invention to provide a battery cell having metal anodes with no significant shape change during charging and discharging for longer life of the battery.

It is an object of the invention to control dendrite formation on metal anodes.

It is an object of the invention to provide fast recharge capability.

It is an object of the invention to increase the turnaround efficiency for recharging the metal air system.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
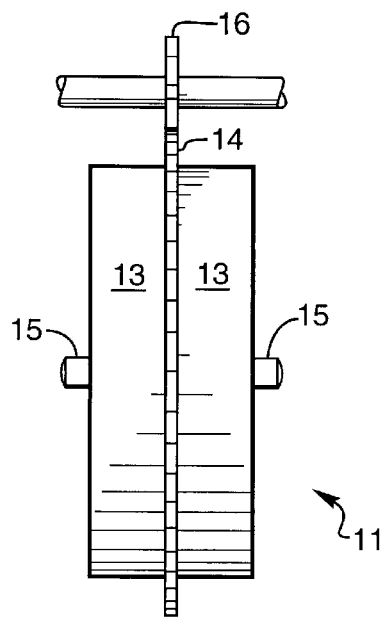
FIG. 1 is a top view of the anode disk.
Figure 2:
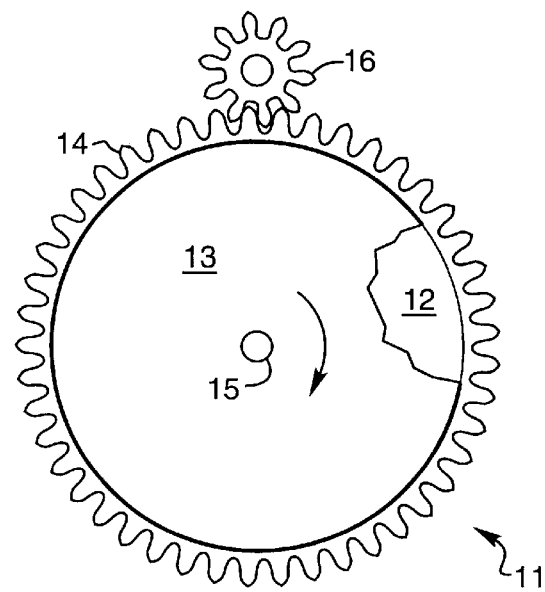
FIG. 2 is a side view of the anode disk.

As shown in FIGS. 1 and 2 the first component of the invention is an anode disk 11 which has a current collecting anode substrate 12 made out of a metal such as nickel or other electrically conductive material which is resistant to corrosion in basic solutions. The current collecting anode substrate 12 has a layer of anode material 13, which may be a metal such as zinc deposited on the current collecting anode substrate 12. The anode disk 11 has an axle 15 on which it can be rotated. The rotation of the disk can be by gears 16, and motor 17 as shown in FIG. 5, engaging teeth 14 on the anode disk 11 or by a motor 17 and drive shaft 47 turning gears 16, engaging teeth 14 on anode disk 11 as shown in FIG. 6.

Figure 3:
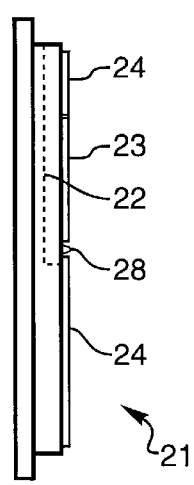
FIG. 3 is a top view of the air electrode disk.
Figure 4:
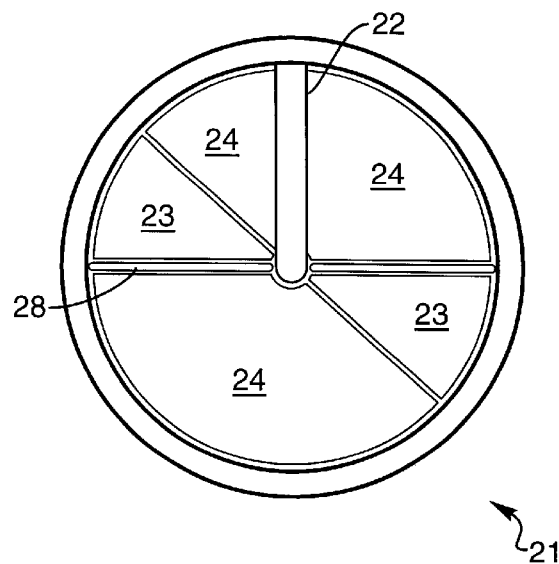
FIG. 4 is a side view of the air electrode disk.

As shown in FIGS. 3 and 4 the second components of the invention are air electrode disks 21 which are a little bit larger in diameter than the anode disk 11. The air electrode disks 21 are divided into discharging air electrode portions 23 and recharging air electrode portions 24. The discharging air electrode portions 23 may be of different sizes and located in different positions on the air electrode disk 21 to maximize the utility of the designed rates for discharging depending on the types of anodes, air electrodes and electrolyte used. The recharging electrode portions 24 may be of different sizes and located in different positions on the air electrode disk 21 to maximize the utility of the designed rates for discharging depending on the types of anodes, air electrodes and electrolytes used.

If more than one set of recharging air electrodes 23 are used as shown in FIG. 4 then the anode disk 11 can be recharged in two or more different portions simultaneously. Similarly if more than one set of discharging air electrodes 24 are used as shown in FIG. 4 then the anode disk 11 can be discharged in two or more different portions of the anode disk 11 simultaneously.

Figure 5:
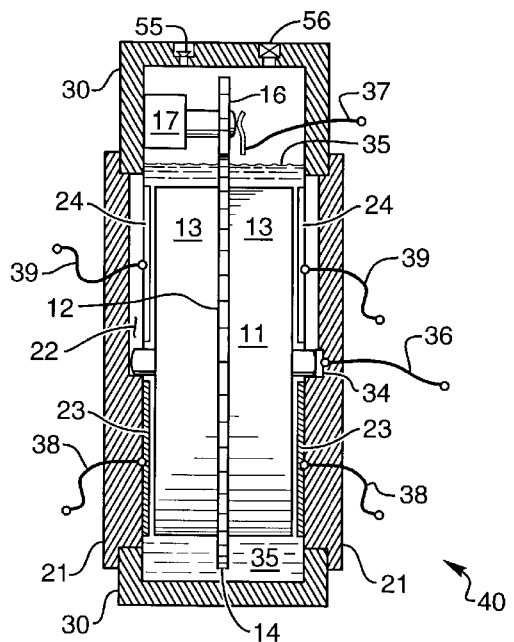
FIG. 5 is a side view of a rotating anode cell.
Figure 6:
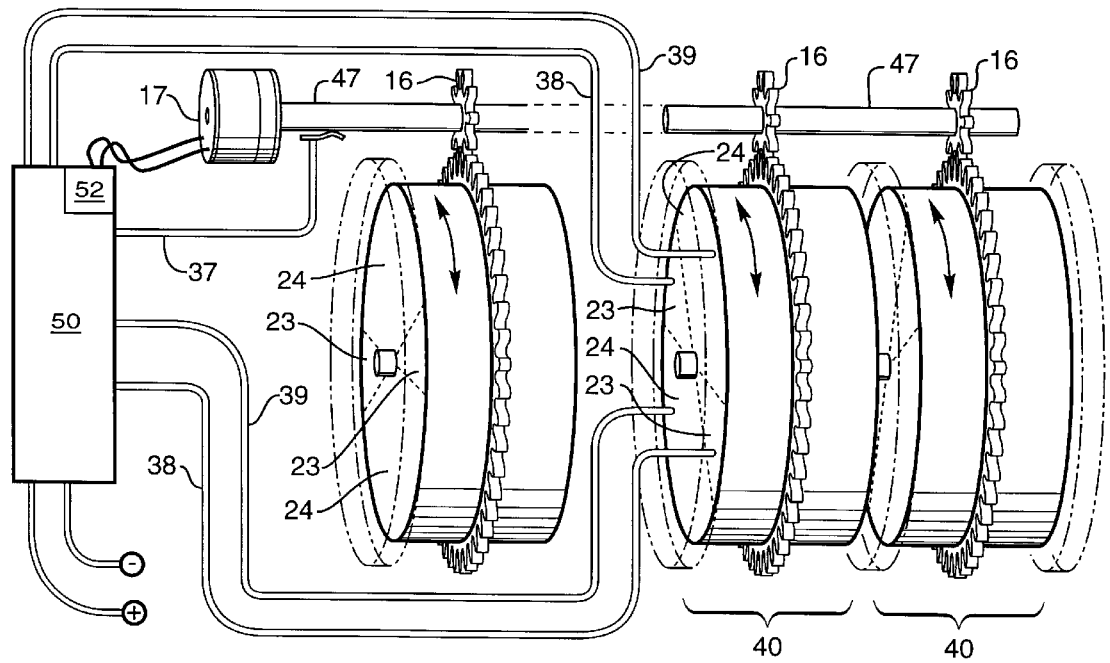
FIG. 6 is a perspective view of a plurality of rotating anode cells making up a fuel cell battery.

The air electrode disks 21 may have axle slots 22 for inserting the axle 15 of the anode disk 11 between two air electrode disks 21 so that the anode disk 11 is rotatable on its axle 15 when sandwiched between two air electrode disks 21 as shown in FIG. 5. The axle slots 22 in the air electrode disks 21 allows the anode disk 11 to be changed from time to time by sliding the old anode disk 11 out and inserting a new anode disk 11.

In an alternative embodiment the anode disk 11 may be permanently fixed between the air electrode disks 21 so that no axle slot 22 is required.

FIG. 5 shows a complete secondary fuel cell battery cell 40. It has an anode material 13, a discharge electrode portion 23, electrolyte 35 and wires 37 and 38 for connecting current generated in the cell 40 to a load. The cell 40 also has a recharging air electrode portion 24 and wires 37 and 39 for supplying current to the cell to recharge the anode material 13. A motor 17 and associated drive gear 16 attached between the air electrode disks 21 engage the gear teeth 14 on the anode disk 11 for rotating the anode disk 11 between the two air electrode disks 21. A seal 30 extending between the air electrode disks 21 at the circumference forms a container with the walls of the air electrode disks 21 for containing electrolyte 35 needed for the fuel cell battery to complete a battery circuit. The seal 30 may have an aperture 56 at the top for adding electrolyte 35 to the cell formed by the anode material 13 and the air electrode disk 21. The seal 30 is optionally removable on the top half of the air electrode disk 21 for removing and replacing the anode disk 11. In an alternative embodiment the seal 30 does not cover the top of the cell 40 leaving the motor and gears exposed and allowing easy access for adding electrolyte 35, however the cell 40 must be upright and is subject to spillage of electrolyte 35.

The motor 17 may be driven at different speeds to maximize recharging or discharging rates. The motor 17 may optionally be outside of the cell 40.

To increase the power of the fuel cell battery a number of cells 40 can be joined together. In this way a high voltage can be achieved.

In FIG. 6 a plurality of cells 40 are shown linked together on a common drive shaft 47. Optionally the individual motors of FIG. 5 may be used to drive each anode disk 11 in each cell 40 separately.

As shown in FIG. 6 the discharge air electrode portions 23 and recharging air electrode portions 24 may be clocked for air management purposes. The air flowing to the discharge electrode portions 23 or from the recharging air electrode portions will benefit from being clocked in such a manner.

In FIG. 6 the drive shaft 47 will conduct electricity to and from the anode disks 11 by contact with driving gear 16 and gear teeth 14 on the conducting anode substrate 12. A wire 37 connects the drive shaft 47 to the controller 50. Wire 38 connects the discharge air electrode portion 23 of the cell 40 to the controller 50. Wire 39 connects the recharge air electrode portion 24 of the cell 40 to the controller 50. The controller 50 controls the speed for the motor 17, in FIG. 6, or the motors 17, if the cells of FIG. 5 are used.

In an alternate embodiment for collecting current from the anode disk 11, as shown in FIG. 5, the anode substrate 12 is connected through axle 15 to electrical contact 34 on the air electrode disk 21, where wire 36 will connect the anode disk 11 to the controller 50.

In a copending patent application Ser. No. 09/074,337, filed May 7, 1998 entitled METAL-AIR FUEL CELL BATTERY SYSTEMS HAVING A METAL-FUEL CARD STORAGE CARTRIDGE, INSERTABLE WITHIN A FUEL CARTRIDGE INSERTION PORT, CONTAINING A SUPPLY OF SUBSTANTIALLY PLANAR DISCRETE METAL-FUEL CARDS, AND FUEL, CARD TRANSPORT MECHANISMS THEREIN the applicant has a system disclosed for managing the amount of charge stored in a fuel cell battery and the measurement of the rates of charging and discharging. Copending patent application Ser. No. 09/074,337, filed May 7,1998 entitled METAL-AIR FUEL CELL BATTERY SYSTEMS HAVING A METAL-FUEL CARD STORAGE CARTRIDGE, INSERTABLE WITHIN A FUEL CARTRIDGE INSERTION PORT, CONTAINING A SUPPLY OF SUBSTANTIALLY PLANAR DISCRETE METAL-FUEL CARDS, AND FUEL CARD TRANSPORT MECHANISMS THEREIN is attached hereto and made a part hereof by reference.

As shown in the application incorporated by reference controller 50 can measure the current flows and other parameters with various sensors, knows the availability of the charge stored on the anode disk 11 and what portion of the disk the charge is stored on. The controller will than manage the discharging and recharging of the anode disk 11 to optimize performance of the cells 40 to provide power to a load or to recharge the cells.

A check valve 55, as seen in FIG. 5, may be used on the top of the cell 40 to exhaust oxygen created during recharging, if the oxygen level in the cell increases the pressure of the cell.

An electrolyte refilling port 56 may be located on the top of the cell 40 to replace electrolyte which is spilled, leaked or otherwise escapes from the cell 40.

Optionally the cell 40 may not be sealed at the top for easier access to replace the anode disks 11 or for adding electrolyte.

The operation of the rotating anode device described above has many advantages over the prior art.

The air electrode disk 21 has separate discharge air electrode portions 23 and recharge air electrodes portions 24. By not using bifunctional air electrodes the recharging air electrode 24 and the discharge air electrode 23 can be optimized for the most efficient discharging or recharging of the anode material 13 on the anode disk 11. With a bidirectional motor 17 the anode disk can be turned backward or forward to operate in the most efficient zones on the anode disk 11, such that on discharging the anode disk 11 will be rotated to a position where the most charge is stored or on recharging the disk will be rotated to where the least charge is stored. With a motor speed controller 52 the motor 17 can turn the anode disk 11 at the optimum rate to charge or discharge the anode disk 11.

The surface areas of the discharge air electrode 23 and the recharge air electrodes 24 can be varied to vary the charging to discharging ratio. For example with a ratio of charging to discharging surface area of the air electrodes of 10 to 1 the recharging can take place 10 times faster than the discharging. If the rotating anode fuel cell battery is used for powering a vehicle, fast recharging times may be important.

Depending on the type of discharge air electrode 23 chosen for discharging the anode material 13, the discharge rates of the anode material 13 will vary. Many factors effect the discharge rate in a fuel cell battery cell, they include but are not limited to the electrolyte 35 used, the spacing between the discharge air electrode 23 and the anode material 13, and the rate at which the anode material 13 is passing in front of the discharge air electrode 23. For example in the art of zinc-air battery cells, various types of anodes and air electrodes have been used in combination. Some air electrodes are better at recharging than for discharging. If the best discharge air electrode 23 is placed on the air electrode disk 21 opposite the anode material 13 on the anode disk 11 and a specified electrolyte 35 is used, the discharge parameters of the system can be maximized for the spacing between the air electrode disk 21 and anode disk 11 for the types of anode materials 13 and discharge air electrodes 23 used.

Similarly for recharging, if the best recharging air electrode 24 is placed on the air electrode disk 21 opposite the anode material 13 on the anode disk 11 and a specified electrolyte 35 is used, the recharge parameters of the system can be maximized for the spacing between the air electrode disk 21 and anode disk 11 for the types of anode materials 13 and recharge air electrodes 24 used.

Individually maximized air electrodes function better than the bifunctional air electrodes of the past. The individually maximized air electrodes for recharging will increase the lifetime of the cell by limiting shape change, densification and dendrite problems in the cell.

One reason for the reduction in the shape change, densification and dendrite problems is that the recharging is performed over a larger surface area at lower current densities so that the anode material 13 is applied at a slower rate and does not build up quickly in any one place. Further since the anode is rotating and the electrolyte 35 is being stirred by the motion of the rotating anode disk 11 the anode material is applied more evenly.

Dendrites grow because anode ions are continually attracted to one point on the anode. Since the anode is moving, that point will be changing positions reducing the chances of localized buildup. If the movement of the anode does not totally stop the dendrite growth a wiper blade 28 can be attached to the air electrode disk 21 at the edge of the recharging air electrode portion 24 to scrape off the dendrites.

The rotating anode is scalable, the diameters of the anode disks 11 and the air electrode disks 21 may be increased or decreased to fit the design needs of the user. For example a small vehicle such as a motor bike would have a smaller diameter rotating anode than a car or a truck.

By rotating the anode disk 11 between two air electrode disks 21 the depth of discharge (DOD) of the anode disk 11 is increased because it limits passivation. An anode will passivate if too much current is drawn from it in too short a time. Passivation can be substantially decreased if the anode is discharged intermittently (in other words, allowing the anode to rest between dischargings can eliminate passivation). The Movable Anode FCB will do exactly that. As each anode section moves away from the discharge electrodes, it has a rest period before it is discharged some more. In addition, because of the Movable Anode's unique recharging capabilities, the anode can afford to be discharged to a high DOD without sacrifice of cycle life whereas most recharging batteries must limit their DOD to ensure reasonable recycleability.

Figure 7:
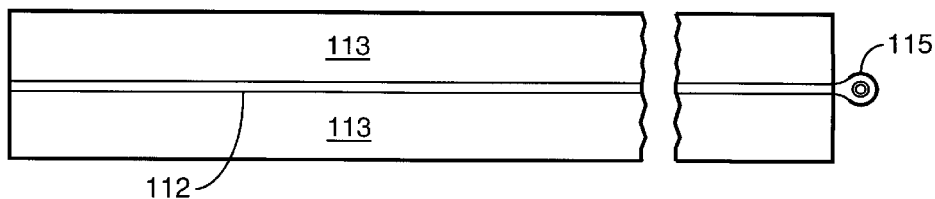
FIG. 7 is a side view of an anode plate.
Figure 8:
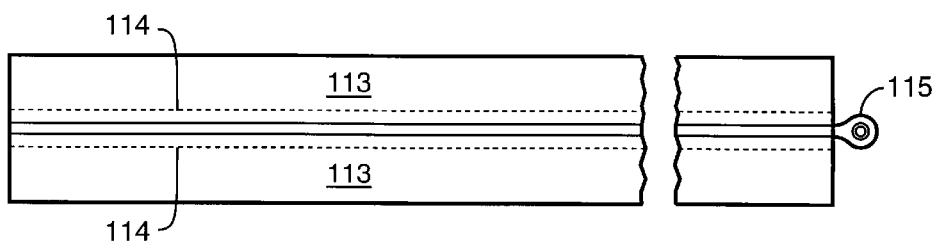
FIG. 8 is a top view of an anode plate.
Figure 9:
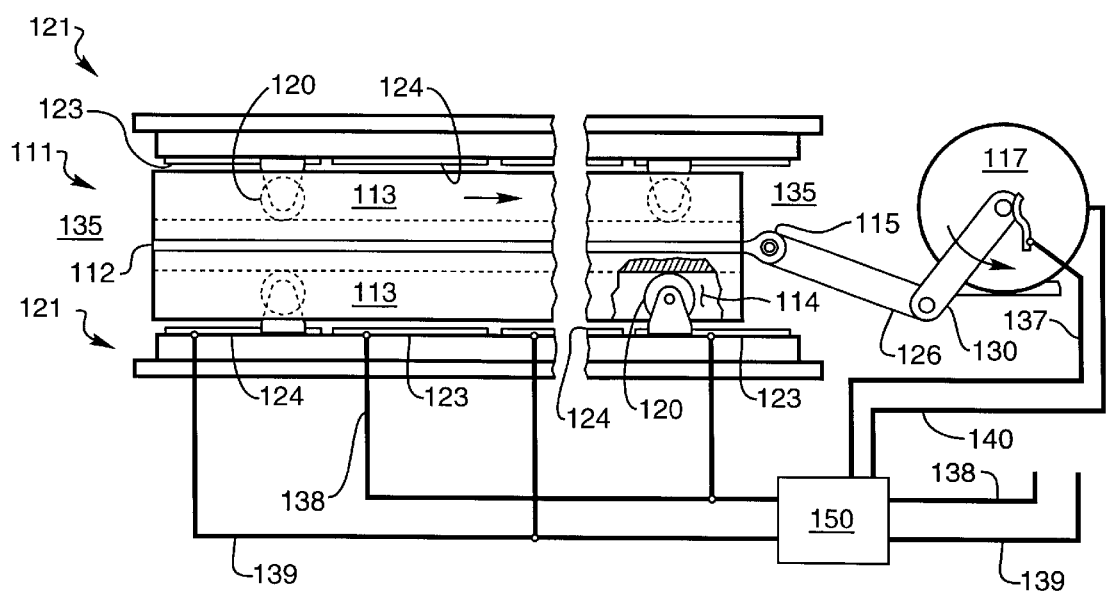
FIG. 9 is a side view of a linear anode cell.

In a second embodiment of the invention, as shown in FIGS. 7, 8 and 9, the anode material 113, instead of being rotated between two air electrode disks 21, is moved linearly between two air electrode plates 121 as shown in FIG. 9.

As shown in FIGS. 7 and 8 anode plate 111 has an anode substrate 112 with anode material 113 thereon.

FIG. 9 shows two air electrode plates 121 each having discharging air electrode portions 123 and recharging air electrode portions 124. Wires 138 and 139 connect the controller 150 to the discharging 123 and recharging 124 air electrodes respectively. Wire 137 connects the controller 150 to the anode plate 111 by way of the link arm attached to the anode plate hitch 115. Guide wheels 120 ride on the wheel track 114 portion of the anode plate 111 to moveably hold the anode plate 111 between the wheel guides 120. The link arm 126 is attached to a crank shaft 130 for moving the anode plate 111 back and forth relative the discharging air electrode portions 123 and recharging air electrode portions 124 of the air electrode plates in electrolyte 135 to charge and discharge the anode material 113 as outlined above. The discharging air electrode portions 123 may be opposite recharging air electrode portions 124 as shown in FIG. 9 or opposite a like air electrode portions. A motor 117 or other means of turning the crank shaft 130 is controlled by controller 150. Wires 140 connect the controller to the motor 117.

Obviously many modifications and variations of the present invention are possible in light of the above teachings. It is therefore to be understood that, within the scope of the appended claims, the invention may be practiced otherwise then as specifically described.

What is claimed and desired to be secured by Letters Patent of the United States is:

1. A rechargeable metal-air fuel cell battery (FCB) system comprising:

two air electrodes, each having at least one recharging portion and at least one discharging portion;

a movable anode having anode material disposed on two sides on electrically-conductive substrate, and being sandwiched between said two air electrodes with an electrolyte disposed between said anode material and said recharging portions and discharging portions.

2. The rechargeable metal-air FCB system of claim 1, further comprising:

a first electrically-conductive pathway coupled to the discharge air electrode portion of the two air electrodes, a second electrically-conductive pathway coupled to the recharging air electrode portion of the two air electrodes, a third electrically-conductive pathway coupled to the anode material of the metal anode, wherein the first electrically-conductive pathway and third electrically-conductive pathway supply electrical current generated in the cell to a load when discharging the anode material, and wherein the second electrically-conductive pathway and third electrically-conductive pathway supply electrical current to the cell when recharging the anode material.

3. The rechargeable metal-air FCB system of claim 1, wherein said recharging portion of each said air electrode is designed for optimum recharging operations, and said discharging portion of said air electrode is designed for optimum discharging operations.

4. The rechargeable metal-air FCB system of claim 1, wherein the area of the recharging air electrode portion of each one of the two air electrodes is larger than the area of the discharging air electrode portions of each one of the two air electrode portions, thereby resulting in faster recharge times.

5. The rechargeable metal-air FCB system of claim 1, wherein said recharging air electrode is operated at lower current densities to prevent anode densification, anode shape change and dendrite growth.

6. The rechargeable metal-air FCB system of claim 1, wherein discharging said anode material on both sides of said movable anode increases depth of the discharge and increases capacity of said FCB system.

7. The rechargeable metal-air FCB system of claim 1, wherein movement of said movable anode assures said anode material is intermittently discharged to reduce passivation and further increase depth of discharge of said anode material.

8. The rechargeable metal-air FCB system of claim 1, wherein motion of said movable anode helps to insure uniform re-plating during recharging operations.

9. The rechargeable metal-air FCB system of claim 1, wherein movement of said anode stirs the electrolyte assuring a uniform distribution of metal ions.

10. The rechargeable metal-air FCB system of claim 1, wherein said movable anode is realized in the form of a rotating anode disk.

11. The rechargeable metal-air FCB system of claim 1, wherein said movable anode is realized in the form of a linearly moving anode, sandwiched between said two air electrodes.

12. The rechargeable metal-air FCB system of claim 1, wherein said discharge air electrode portion of the two air electrodes is used solely for discharging anode material.

13. The rechargeable metal-air FCB system of claim 1, wherein said recharging air electrode portion of the two air electrodes is used solely for recharging anode material.

14. A movable anode fuel cell battery (FCB) system comprising:

two air electrodes, each said electrode having at least one recharging air electrode portion and at least one discharge air electrode portion;

a metal anode having a substrate with metal anode material on either side of the substrate disposed proximate to and between the two air electrodes, wherein the metal anode is movable with respect to the two air electrodes, an electrolyte for contacting the air electrodes and anode material to form a cell, means for moving the anode material relative to the recharging air electrode portion for recharging the anode material and for moving the anode material relative to the discharging air electrode portion for discharging the anode material, a first electrically-conductive pathway coupled to the discharge air electrode portion of the two air electrodes, a second electrically-conductive pathway coupled to the recharging air electrode portion of the two air electrodes, a third electrically-conductive pathway coupled to the anode material of the metal anode, wherein the first electrically-conductive pathway and third electrically-conductive pathway supply electrical current generated in the cell to a load when discharging the anode material, and wherein the second electrically-conductive pathway and third electrically-conductive pathway supply electrical current to the cell when recharging the anode material.

15. The movable anode FCB system of claim 14, further comprising:

a controller operably coupled to the means for moving the anode material in order to control speed and direction of the anode's motion.

16. The movable anode FCB system of claim 14, wherein:

area of the recharging air electrode portion for each one of the two air electrodes is greater than area of the discharging air electrode portion of each one of the two air electrodes such that recharging the anode will be faster than discharging and at a lower current density.

17. The movable anode FCB system of claim 14, further comprising:

a wiper blade attached to the air electrode, adjacent to the recharging air electrode portion, for contacting the anode such that dendrites on the anode are scraped off the anode by the wiper blade as the anode moves relative to the wiper blade.

18. The movable anode FCB system of claim 14, further comprising:

a mechanism for replacing said metal anode for mechanically recharging the fuel cell battery with new metal anodes.

19. The movable anode FCB system of claim 18, wherein: said air electrodes have axle slots the metal anode has an axle that engages in the axle slots for removing and replacing metal anodes.

20. The movable anode FCB system of claim 14, wherein the anode material rotates relative the air electrodes.

21. The movable anode FCB system of claim 14, wherein the anode material moves linearly relative to the air electrodes.

22. The movable anode FCB system of claim 14, wherein a plurality of movable anode fuel cells operate simultaneously such that their combined electrical output is delivered to a load.

23. The movable anode FCB system of claim 22, wherein:

the means for moving the anode material comprises a motor that drives a common drive shaft connected to all anodes in the fuel cells such that the drive shaft moves all the anodes at the same time.

24. The movable anode FCB system of claim 22, wherein:

the means for moving the anode material comprises a separate motor for each anode fuel cell to drive the anode independently of other anodes.

25. The movable anode FCB system of claim 24, wherein a controller controls each motor such that speed and direction of each anode in each cell is controlled to maximize the efficiency of the fuel cell battery.

26. The movable anode FCB system of claim 22, wherein the plurality of cells are adjacent to each other and the recharging and discharging air electrodes for each cell are clocked with respect to the adjacent cells for air management.

* * * * *